United States Patent [19]

Daniel

[11] Patent Number: 4,964,207
[45] Date of Patent: Oct. 23, 1990

[54] BLADE SETTING TOOL ASSEMBLY FOR A BLADE SEAL BAR AND METHOD OF USING

[75] Inventor: Gary R. Daniel, Chesterfield County, Va.

[73] Assignee: Reynolds Metals Company, Richmond, Va.

[21] Appl. No.: 385,837

[22] Filed: Jul. 27, 1989

[51] Int. Cl.$^5$ .............................................. B23Q 3/00
[52] U.S. Cl. ..................................... 29/468; 29/464;
29/525.1; 29/271; 29/281.1
[58] Field of Search ...................... 29/464, 468, 525.1,
29/270, 271, 281.1; 248/313, 316.1

[56] References Cited

U.S. PATENT DOCUMENTS

| | | | |
|---|---|---|---|
| 2,113,598 | 4/1938 | Mueller . | |
| 2,184,356 | 12/1939 | Lindgren | 100/70 |
| 2,513,821 | 7/1950 | Schneider | 254/131 |
| 3,656,393 | 4/1972 | Goellner | 29/464 X |
| 3,724,056 | 4/1973 | Antal | 29/253 |
| 3,774,287 | 11/1973 | Ireland | 29/251 |
| 4,506,501 | 3/1985 | DeVall et al. | 59/7 |
| 4,561,163 | 12/1985 | Cox | 29/464 |
| 4,678,271 | 7/1987 | Beauliiu | 29/464 X |
| 4,755,340 | 7/1988 | Ermer | 29/464 X |

FOREIGN PATENT DOCUMENTS 1220917   3/1986   U.S.S.R. ................ 29/468

Primary Examiner—Timothy V. Eley
Attorney, Agent, or Firm—Alan T. McDonald

[57] ABSTRACT

A blade setting tool assembly for clamping a plurality of heat seal and cutting blades within a blade retaining channel of a three blade seal bar is disclosed. The blade setting tool assembly includes a blade positioning block having an upwardly directed blade positioining slot extending along its length to receive the exposed blade edges. A pair of mounting straps fixed to the blade positioning block extend upwardly along opposite sides of the block and include upper ends terminating above the height of the blade seal bar. The strap upper ends are each formed with a slot open to one of the vertical edges thereof to receive opposite end portions of an eccentric roller extending between the upper ends. Rotation of the roller causes an eccentric or throw portion thereof to firmly press against the top surface of the blade seal bar to transmit clamping pressure which firmly seats the blades within the channel with the exposed blade edges pressed against the blade positioning slot bottom into a desired profile relationship. Existing screws are then used to tighten the clamping bar portions of the blade seal bar together to firmly clamp the blades within the blade retaining channel. A method of properly positioning and clamping plural blades along their entire length with the blade setting tool assembly of the invention is also enclosed.

11 Claims, 2 Drawing Sheets

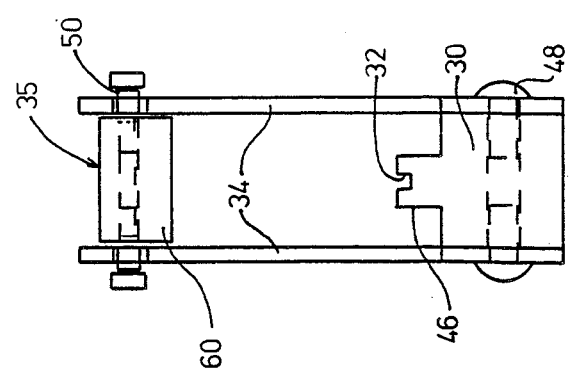
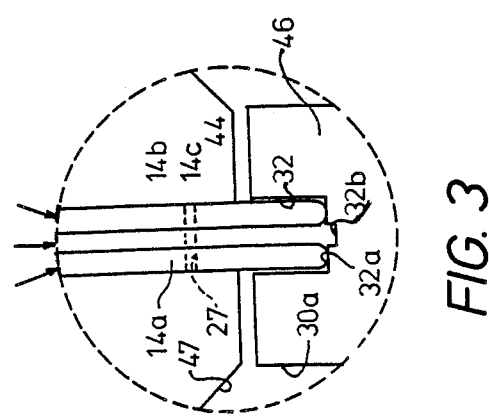
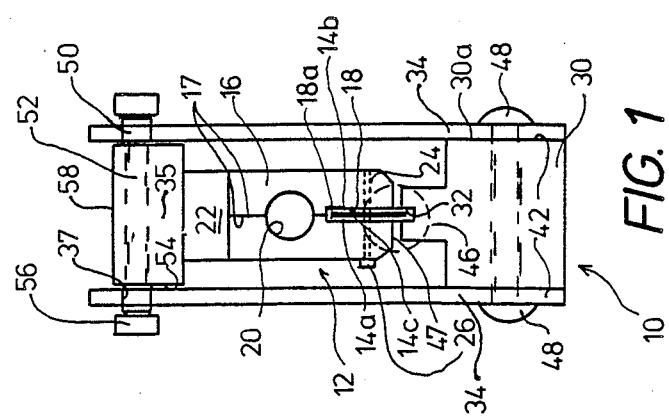

BLADE SETTING TOOL ASSEMBLY FOR A BLADE SEAL BAR AND METHOD OF USING

TECHNICAL FIELD

The present invention generally relates to blade setting tools and, more particularly, to a blade setting tool assembly for clamping a pair of heat seal blades and a center cutting blade of a three blade seal bar into a desired profiled relationship.

BACKGROUND ART

Three blade seal bars are commonly utilized in the thin film packaging industry for cutting a continuous ribbon of thin film packaging material (e.g., plastic or polyethylene sheeting) around a product which is conveyored to and wrapped, using known equipment, at a wrapping station. One or more seal bars are positioned at the wrapping station in a known manner, to simultaneously cut and heat seal the film, along its tracking edge and optionally along its cut length, while forming the heat seal along the leading edge of the thin film material to be wrapped around the next in line product arriving at the wrapping station.

More specifically, the three blade seal bar comprises a pair of identical blade clamping bars adapted to be clamped together with tightening screws located at spaced intervals along the length of the bars. The bars define a blade retaining channel along their length opening to the bottom edge of the seal bar. The heat seal blades with the center cutting blade therebetween project downwardly out of the channel with the center cutting blade having a blade edge projecting below the corresponding blade edges of the heat seal blades to effect cutting of the continuous packaging film. Depending upon the product being packaged, a pair of seal bars may be arranged in L-shaped configuration in plan view to simultaneously form longitudinal and transversely extending seals around the product.

It is important that the cutting and heat seal blades be properly clamped within the blade retaining channel along their entire lengths so that the respective elevational position of each blade cutting or sealing edge is constant along the entire blade length, with the cutting edge of the center blade projecting downwardly from the heat sealing blade edges. Otherwise, without the desired profiled positional and elevational relationship of the blades along their lengths, cutting and/or heat sealing of the packaging film may not properly occur, causing disruption and down time of the packaging process.

Since the blades are often slightly bowed along their length prior to insertion into the blade retaining channel formed between the clamping bars, it is of critical importance to progressively apply clamping pressure along the length of the bars while tightening the screws during clamping to ensure that the blades are properly seated within the channel in the above mentioned profiled relationship. A positioning block having an elongate, upwardly directed blade positioning slot is conventionally used to properly seat the blades within the blade retaining channel. The block is grasped by the user with one hand and the three blade edges are directed into the positioning slot beginning at one end of the blades. Manual pressure is then exerted by the user to press the blade edges firmly against the bottom of the positioning slot; this pressure is transmitted to seat the blade portions within the channel. While applying manual pressure, the user then tightens the screws which extend adjacent the positioning block. After tightening, manual pressure is then released, the block slid towards the adjacent unclamped blade portions, manual pressure reapplied and maintained while the user tightens the next set of tightening screws until the blades are clamped within the channel along their entire length.

Since manual pressure is relied upon to progressively clamp the blades within the channel along their length, any variations in manual pressure may cause the corresponding blade portions to be seated and clamped within the channel at varying elevational locations. During packaging, therefore, proper cutting and/or heat sealing of the packaging film along the blades may not properly occur.

DISCLOSURE OF THE INVENTION

It is accordingly one object of the present invention to provide a blade setting tool assembly that progressively imparts a constant force acting along the plane of the blades to properly seat the blades within the blade retaining channel of a blade seal bar while simultaneously maintaining a desired profiled relationship between the blade edges.

Another object of the invention is to provide a blade setting tool assembly that is easily mounted to and progressively slid along the entire length of the blades to impart the same constant force to the blades along their length.

Still a further object is to provide a blade setting tool assembly that provides this constant seating force while freeing the hands of the user to properly and rapidly tighten the clamping screws of the blade seal bar.

Yet a further object is to provide a blade setting tool assembly that may progressively slide between adjacent blade portions along the entire length of the blades without requiring removal of the blade setting tool assembly from the blade seal bar during the blade clamping process.

A blade setting tool assembly is disclosed for clamping a plurality of blades between a pair of clamping bars of a cutting tool with the exposed blade edges maintained in a desired profiled relationship with each other. In accordance with the present invention, the assembly comprises a blade positioning block having an upwardly directed blade positioning slot extending along its length to receive the exposed blade edges. A pair of mounting straps are affixed to extend upwardly along opposite sides of the block a distance greater than the height of the cutting tool. The upper ends of the straps support a rotatable eccentric roller which extends between the upper ends. In operation, the blades are properly clamped between the clamping bars by first positioning the block below the cutting tool with the exposed blade edge portions disposed within the blade positioning slot and the mounting straps extending upwardly along opposite sides of the cutting tool. The clamping roller is then rotated along its axis of rotation to cause an eccentric throw portion thereof to contact the top surface of the cutting tool and exert clamping pressure thereagainst. This pressure is transmitted by the straps and block through the blade positioning slot to cause the blades to be properly seated within the blade retaining channel with the exposed blade edges pressed firmly against the bottom of the blade positioning slot in their desired profiled relationship. While the clamping pressure is continuously and automatically applied by the eccentric roller, the clamping bars may be tightened against each other by the user using the existing tightening screws extending along the blade portions currently being clamped with the tool. After tightening, the eccentric is rotated out of contact with the blade seal bar, the tool is moved further along the bar to the adjacent unclamped portions of the blades and the procedure is repeated until all areas of the blades have been clamped and tightened under the constant clamping force of the eccentric roller.

The blade setting tool of the present invention is preferably used in conjunction with a three blade heat seal bar having a pair of heat seal blades and a center cutting blade disposed therebetween. The bottom of the blade positioning slot is profiled, i.e., grooved, to locate the blade edge of the center cutting blade in a position projecting downwardly from the corresponding blade edges of the heat seal blades.

The eccentric roller is preferably formed with cylindrical mounting projections extending outwardly from opposite ends thereof along the axis of rotation. The mounting projections are respectively received in a pair of inclined slots formed, in corresponding locations, in the upper ends of the straps to orient the roller and its axis of rotation in a plane parallel to the plane of the bottom of the blade positioning slot. The bottom of each inclined slot is preferably rounded and has the same radius of curvature as the diameter of the cylindrical mounting projections to permit smooth, guided rotational movement of the eccentric or throw portion about the rotational axis extending through the cylindrical mounting hubs.

The feature of detachably mounting the eccentric roller to the strap upper ends by passing the cylindrical mounting hubs through the open ends of the inclined slots enables the blade setting tool assembly to be mounted to any portion of the blades (at or between its opposite ends) by first removing the eccentric roller and then passing the straps along opposite sides of the seal bar as the blade positioning slot is guided into contact with the exposed blade edges. The eccentric roller is then repositioned between the upper ends by inserting the cylindrical mounting hubs into the open ends of the inclined slots.

The blade positioning block preferably has a width greater than the width of the blade seal bar so that the straps properly clear the outer vertical sides of the seal bar during mounting. The blade positioning slot is preferably formed in an elongate protrusion of rectangular cross-section extending upwardly from the top surface of the block. The height of the protrusion and the depth of the blade positioning slot are formed so that the top surface of the protrusion is spaced below the bottom surface of the clamping bars from which the blades project downwardly below from the channel.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 1 is an end elevational view of the blade setting tool assembly in operative clamping contact with a three blade seal bar and the sealing and cutting blades thereof;

FIG. 2 is a view similar to FIG. 1 with the three blade seal bar removed;

FIG. 3 is an enlarged, cross-sectional view of the positioning of the cutting and sealing blades in the blade positioner slot of the blade setting tool assembly;

BEST MODE FOR CARRYING OUT THE INVENTION

Figure 4B:
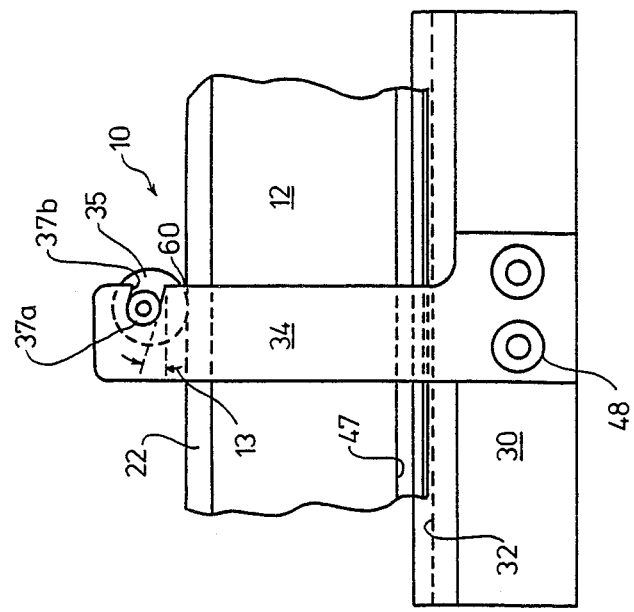
FIG. 4B is a view similar to FIG. 4A with the eccentric rotated into its operative, clamping position.

FIG. 1 an end plan view of blade setting tool assembly 10 in operative clamping contact with a three blade seal bar 12 for positioning a pair of outer heat sealing blades 14a and 14b in a desired profile relationship with a cutting blade 14c disposed therebetween. The seal bar 12 comprises a pair of substantially identical blade clamping bars 16 having identical inward facing surfaces 17 each formed with a groove extending the lengths of the clamping bars and opening to the bottom edge of the bar to establish, upon assembly of the clamping bars to each other, a rectangular blade retaining channel 18 from which the sealing and cutting blades 14a-14c project downwardly. The surface 17 of each clamping bar is also formed with a semi-cylindrical groove extending the length of the bars and opening to the opposite ends thereof. In assembled relationship, the semicylindrical grooves define a cylindrical cavity 20 extending the length of the bars into which heating coils (not shown) are conventionally disposed to apply heat to the blade assembly. A top bar 22 completes the structure of seal bar 12.

The blade clamping bars 16 are provided with transversely extending through-holes 24 at longitudinally spaced intervals along the length of each bar that intersect the blade retaining channel 18 in coaxial alignment with each other upon assembly of the clamping bars. The through-holes 24 are threaded to receive clamping screws 26 spaced longitudinally along the seal bar and which extend through retaining slots 27 in the sealing blades 14a-14c. Each clamping screw 26 must be individually tightened to clamp the blades 14a-14c along the entire length of the clamping bars 16 to obtain the proper profiled spacing (FIG. 3) of the blades relative to each other along the entire seal bar length. More specifically, it is important that the center cutting blade 14c project downwardly from the outer heat sealing blades 14a-14b (whose sealing edges must be maintained at the same elevation) so as to properly cut the packaging material (e.g., plastic film) while the leading heat sealing blade forms an end seal of a packaged product at the packaging station as the trailing heat sealing blade simultaneously forms a front seal of a next-in-line product to be packaged. Without the desired profiled positional relationship of the blades 14a-14c, cutting and/or heat sealing of the packaging film may not properly occur along the entire length and/or width of the product. Since the blades 14a-14c are often slightly bowed along their length prior to insertion into the blade retaining channel 18, it is of critical importance to progressively apply clamping pressure along the length of the clamping bars 16 while tightening the screws 26 during application of pressure to ensure that the blades are properly seated within the channel in the above-mentioned profiled relationship.

To seat blades 14a–14c within the blade retaining channel 18 of blade seal bar 12, blade setting tool assembly 10 of the present invention comprises a blade positioning block 30 having an upwardly directed blade positioner slot 32 along its length, a pair of rigid parallel straps 34 projecting upwardly from vertical sides 30a of the block and an eccentric clamping roller 35 detachably mounted within a pair of inclined retaining slots 37 formed in the upper ends of the straps. In operation, with the eccentric clamping roller 35 initially removed, the blade positioner block 30 is positioned beneath an end portion of blades 14a–14c projecting downwardly from the blade retaining channel 18, making sure that the blade edges are disposed within the blade positioning slot 32 with the center blade 14c received in the bottom of central slot 32b formed in the blade positioning slot. The width of the block 30 is greater than the width (defined by the distance between the outer sides 30a of the blade clamping bars 16) of seal bar 12 so that the straps 34 are spaced from the outer sides of the blade clamping bars to project upwardly above the height of the seal bar. The eccentric 35 is then positioned within the slots 37 to extend transversely in spaced relation to the top surface 38 of the seal bar 12 (FIG. 4A), and is rotated to its bottom dead center position (FIG. 4B) into contact with the top surface of the seal bar. As the eccentric ia manually rotated in the direction of arrow A (FIG. 4A) from its clear position, it begins to contact the seal bar top surface 38 causing the blade positioner slot 32 to exert an upwardly applied pressure against the blade portions 14a–14c seated therein which in turn causes the blades to seat firmly against the bottom 18a of the blade retaining channel 18 while the blade edges are maintained in the desired profile relationship by pressing contact with the bottom 32a of the positioner slot. Continued rotation of the eccentric into its bottom dead center position (FIG. 4B) completes the clamping process whereupon the clamping screws 26 extending adjacent the length of the positioning block 30 are tightened to tighten the clamping bars 16 against the blade portions. The eccentric 35 is then released from the top surface 38 of the seal bar 12 by either clockwise or counterclockwise rotation which relaxes the clamping pressure applied to the blade portions by the block 30. The unclamped tool assembly 10 is then slide along the seal bar 12 to the next adjacent unclamped portion of the blades 14a–14c and the above clamping procedure is repeated until the entire length of the blades have been clamped between the bars 16 into their desired profiled relationship.

The positioner block 30 is preferably of elongate, rectangular construction having parallel vertical sides 42 defining a block width greater than the width of the blade seal bar 12 as described above. The blade positioner slot 32 is formed in the top surface 44 of an upwardly projecting elongate protrusion 46 of rectangular cross-section that extends the full length of the block 30. The protrusion 46 and slot 32 are centered along a plane extending vertically through the central longitudinal axis of the block 30 so as to enter into vertical alignment with the blades 14a–14c in the blade retaining channel 18 and symmetrically transmit the clamping forces to the blades through the bottom wall 32a of the slot 32.

Figure 4A:
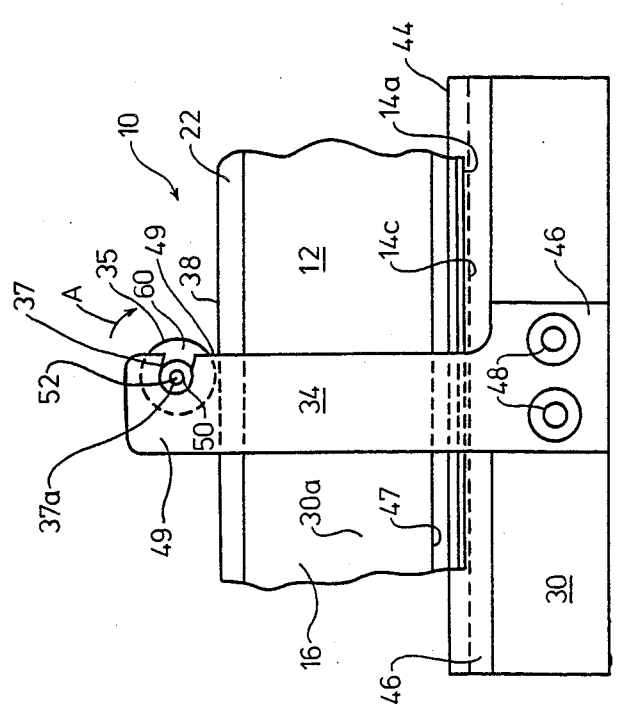
FIG. 4A is a side elevational view of the blade setting tool assembly mounted to the blade seal bar with the eccentric depicted in its non-clamping position.

As depicted in FIG. 4A, the height of the elongate protrusion 46 and the depth of the blade positioner slot 32 are so dimensioned to provide a clearance between the bottom edge 47 of the seal bar 12 and the top surface 44 of the protrusion to enable the exposed blade edges projecting downward from the clamping bars 16 to firmly engage the bottom 32a of the blade positioner slot in the clamping position.

In operation, the clamping forces are reliably transmitted from the eccentric 35 to the blade positioner slot 32 along the entire length of the block 30. Therefore, when repeating the above clamping procedure, the unclamped blade setting tool assembly is slid along the bar from that portion of the blade (defined by the length of the block) now clamped in the desired profile relationship within the blade retaining channel 18 of the blade clamping bars 16 to the next adjacent unclamped portion of the blades to be defined by the block length.

The pair of rigid parallel straps 34, preferably metal, are each formed with lower end portions having extensions 46 that enable the straps to be fixed to the vertical sides 42 of the block 30 with a pair of fastening screws 48 as best depicted in FIGS. 2 and 4A. Each strap 34 extends parallel to the plane defined by the vertical sides 42 of the block 30 in spaced, parallel relation to the other strap. The upper ends 49 of the straps are each formed with one of the inclined retaining slots 37 communicating with one of the vertical edges 49 of each strap to receive the eccentric clamping roller 35 in the manner described more fully below. The retaining slots 37 are positioned in corresponding locations on their respective straps 34 to orient the rotational axis 52 of the eccentric roller parallel to the upper surface 38 of the seal bar 12.

The eccentric roller 35 has a length less than the distance between the upper ends of the straps 34 but greater than the width of the seal bar 12. The eccentric roller 35 is retained within the inclined slots 37 by means of a pair of short cylindrical mounting projections or hubs 50 projecting from opposite flat sides 54 of the roller 35 in coaxial alignment with the axis of rotation 52. The short cylindrical mounting projections 50 are secured to the flat faces 54 with a screw 56 passing through each mounting projection into threaded contact with a bore 58 extending through the roller 35 along the axis of rotation 52 as best depicted in FIG. 1. The diameter of each cylindrical mounting projection 50 is slightly less than the distance between the opposing walls 37b of each retaining slot 37; the radius of curvature defining the bottom 37a of each retaining slot is substantially the same as that of each cylindrical mounting projection. The opposing side walls 37b of each slot 37 extend at a downwardly inclined predetermined angle B (e.g., 10°) in relation to a horizontal plane extending through each slot. In this manner, manual rotation of the eccentric roller (e.g. by manually rotating the screw head portions 56 projecting outwardly from each strap 34 as depicted in FIG. 2) from the unclamped position of FIG. 4A (wherein the eccentric or throw portion 60 of eccentric roller 35 projects upwardly or away from the top surface 38 of the seal bar 12) into the clamping, bottom dead center position of the throw portion enables smooth clamping contact to occur along the entire length of the roller and the full width of the top 38 surface of the seal bar since the cylindrical mounting projections 50 are free to travel through the length of each slot 37 into contact with the curved slot bottom edge 37a enabling smooth rotation of the throw portion of the clamping roller into its bottom dead center position.

With the blade setting tool assembly 10 of the present invention, the heat seal and cutting blades 14a–14c of the three blade seal bar 12 are reliably positioned within the blade retaining channel 18 with the blade edges in the desired profile relationship to obtain reliable cutting and heat sealing action (along opposite sides of the center cutting blade) during the packaging process. The blade setting tool assembly 10 is easily mounted to the seal bar 12 along any portion thereof by the feature of having the eccentric roller 35 removably detached from the strap upper ends through the slots 37.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. A blade setting tool assembly for clamping a plurality of blades in a blade retaining channel formed between a pair of clamping bars of a cutting tool, said blades having exposed blade edges adapted to project outwardly from the retaining channel, comprising:
    (a) a blade positioning block having an upwardly directed blade positioning slot extending along its length to receive the exposed blade edges;
    (b) a pair of mounting straps fixed to the blade positioning block and extending upwardly along opposite sides of the block a distance greater than the height of the cutting tool;
    (c) an eccentric clamping roller including a throw portion and means for mounting said roller to extend between upper ends of said straps for rotation about a transverse axis extending through the upper ends;
    whereby said blades are clamped between said clamping bars by positioning the block below the cutting tool with the exposed blade edges disposed within the blade positioning slot and the mounting straps extending upwardly along opposite sides of the cutting tool, followed by rotating said clamping roller along said axis of rotation to cause the throw portion to contact the top surface of the cutting tool and exert clamping force thereagainst which is transmitted by the straps and block to the blade positioning slot to cause the blades to be properly seated within the blade retaining channel with the exposed blade edges pressed firmly against the bottom of the blade positioning slot in a desired elevational relationship with each other, whereupon the clamping bars are tightened against each other to securely clamp the blades therebetween.

2. The blade setting tool of claim 1, wherein said cutting tool is a heat seal bar having a pair of heat seal blades and a center cutting blade disposed therebetween, the bottom of said blade positioning slot being profiled to locate the blade edge of the center cutting blade to project outwardly from the corresponding blade edges of the heat seal blades.

3. The blade setting tool of claim 1 or 2, wherein said roller mounting means includes a pair of cylindrical mounting projections extending outwardly from opposite ends of the roller along the axis of rotation, the mounting projections being respectively received in the upper ends of the straps to locate the roller and its axis of rotation in a plane parallel to the plane of the bottom of the blade positioning slot.

4. The blade setting tool assembly of claim 3, wherein each strap upper end is respectively formed with a slot being open to one of the edges of the strap upper end, said roller being removably mounted between the straps by respectively positioning each mounting projection in the slots through the open ends thereof.

5. The blade setting tool assembly of claim 4, wherein said mounting projections are fixed to opposite ends of the roller with screws extending axially through the projections into fixed threaded contact with threads formed in an axial bore within the roller along the axis of rotation.

6. The blade setting tool assembly of claim 5, wherein said blade positioning slot is formed in an elongate protrusion extending along the upper surface of the block.

7. The blade setting tool assembly of claim 6, wherein said blade positioning slot extends the entire length of the block and protrusion thereon and is open at opposite ends thereof.

8. The blade setting tool assembly of claim 7, wherein said straps are fixed at lower ends thereof to outer vertical sides of the block and extend parallel to each other.

9. The blade setting tool assembly of claim 4, wherein each roller receiving slot is formed with a pair of side walls and a slot bottom having a radius of curvature substantially equal to the diameter of cylindrical mounting projections, said sides of the slots being inclined downwardly from the slot bottom at a predetermined angle.

10. A method of clamping a pair of heat seal blades and a center cutting blade therebetween within a blade retaining channel of a heat seal bar, said blade retaining channel being formed between a pair of clamping bars of the seal bar with the blade retaining channel opening in the bottom edge of the heat seal bar, said blades having their exposed blade edges projecting from the channel in a desired profile relationship with the center cutting blade edge projecting downwardly from the corresponding edges of the heat seal blades, said blades being securely clamped along their entire length within the blade retaining channel by means of a blade setting tool assembly comprising a blade positioning block having an upwardly directed blade positioning slot extending along its length, a pair of mounting straps fixed to the blade positioning block to extend upwardly along opposite sides of the block, and an eccentric roller extending between said upper ends above the blade positioning block, comprising the steps of:
    (a) placing the blade positioning block beneath the heat seal bar and positioning a portion of the exposed blade edges in the blade positioning slot with the mounting straps extending along opposite sides of the blade seal bar;
    (b) rotating the eccentric roller along an axis of rotation passing through and between the strap upper ends so that a throw portion of the eccentric roller presses against a top surface of the heat seal bar to transmit clamping force through the straps and positioning block causing the blade exposed edges to be firmly pressed against the bottom of the blade positioning slot into their desired profile relationship while seating the blades within the blade retaining channel; and, with the blades pressed into the channel and positioning slot under the clamping pressure of the eccentric roller, tightening existing screws passing through the clamping bars to securely clamp the blades within the blade retaining channel; and (c) rotating the eccentric roller out of contact with the heat seal bar after tightening of said screws.

11. The method of claim 10, comprising the further steps of sliding the blade positioning block with the blades remaining in the blade positioning slot towards the next adjacent portion of the blades and repeating the steps of claim 10 until the blades have been clamped and tightening within the blade retaining channel along their entire length.

* * * * *